United States Patent
Hakes et al.

(10) Patent No.: US 10,946,911 B2
(45) Date of Patent: Mar. 16, 2021

(54) MULTI-MATERIAL TRACK PAD FOR A CONTINUOUS TRACK ASSEMBLY

(71) Applicant: Caterpillar Inc., Deerfield, IL (US)

(72) Inventors: David Hakes, Brimfield, IL (US); Benjamin Jones, Bartonville, IL (US); Benoit Abello, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 338 days.

(21) Appl. No.: 15/984,554

(22) Filed: May 21, 2018

(65) Prior Publication Data
US 2019/0351958 A1 Nov. 21, 2019

(51) Int. Cl.
*B62D 55/20* (2006.01)
*B62D 55/21* (2006.01)
*B62D 55/26* (2006.01)

(52) U.S. Cl.
CPC .......... *B62D 55/202* (2013.01); *B62D 55/21* (2013.01); *B62D 55/26* (2013.01)

(58) Field of Classification Search
CPC .............................. B62D 55/21; B62D 55/202
See application file for complete search history.

(56) References Cited

U.S. PATENT DOCUMENTS

| | | | | |
|---|---|---|---|---|
| 3,955,855 A | * | 5/1976 | Massieon | B62D 55/202 305/192 |
| 5,121,831 A | * | 6/1992 | Fesler | B65G 17/38 198/853 |
| 9,434,428 B2 | * | 9/2016 | Hakes | B62D 55/32 |
| 9,623,921 B2 | | 4/2017 | Wodrich | |
| 9,719,158 B2 | | 8/2017 | Westoby | |
| 2006/0181151 A1 | | 8/2006 | Wodrich | |
| 2014/0346856 A1 | * | 11/2014 | Colwell | B62D 55/202 305/185 |
| 2015/0130268 A1 | * | 5/2015 | Scheuerman | B62D 55/15 305/116 |
| 2016/0185404 A1 | * | 6/2016 | Westoby | C21D 9/0068 305/201 |
| 2017/0057572 A1 | * | 3/2017 | Hakes | B62D 55/21 |
| 2017/0057574 A1 | * | 3/2017 | Hakes | B62D 55/21 |
| 2017/0240230 A1 | * | 8/2017 | Colwell | B62D 55/12 |
| 2017/0275717 A1 | * | 9/2017 | Saad | C21D 7/04 |
| 2018/0029653 A1 | | 2/2018 | Johannsen | |

FOREIGN PATENT DOCUMENTS

| | | |
|---|---|---|
| CA | 1141803 A | 2/1983 |
| JP | 0323025 | 1/1991 |
| WO | 9935025 | 7/1999 |
| WO | 2015187333 A1 | 12/2015 |
| WO | 2016037231 A1 | 3/2016 |

* cited by examiner

Primary Examiner — Kip T Kotter
(74) Attorney, Agent, or Firm — Harrity & Harrity LLP

(57) ABSTRACT

A multi-material track pad for a continuous track assembly is disclosed. The track pad may include a body with a ground-engaging surface, wherein the body is formed of a metal material with a first hardness; a roller-engaging surface, wherein the roller-engaging surface is formed of a ceramic material with a second hardness that is greater than the first hardness; and a sprocket-engaging surface formed of the ceramic material.

20 Claims, 3 Drawing Sheets

US 10,946,911 B2

MULTI-MATERIAL TRACK PAD FOR A CONTINUOUS TRACK ASSEMBLY

TECHNICAL FIELD

The present disclosure relates generally to a continuous track assembly and, more particularly, to a multi-material track pad for such a continuous track assembly.

BACKGROUND

Continuous track, also called tank tread or caterpillar track, is a system of vehicle propulsion in which a continuous band of treads (e.g., track pads, track links, etc.) is driven by two or more wheels and/or sprockets. The band may be made of modular plates or pads. The large surface area of the tracks distributes the weight of the vehicle better than steel or rubber tires on an equivalent vehicle, enabling a continuous tracked vehicle to traverse soft ground with less likelihood of becoming stuck due to sinking. In the case of heavy equipment, track pads of the band may be subject to significant wear from contact with rollers and/or a sprocket that drives the band.

One attempt to mitigate wear with regard to a track link is disclosed in International Application Publication No. 99/35025 to Barlow, that was filed on Jan. 5, 1999 ("the '025 application"). In particular, the '025 application discloses a track link comprising a body part and a guidance horn wherein the body part and the guidance horn are integral with each other and are made of light alloy and at least one of the body part and the guidance horn have embedded in the light alloy thereof a discrete ceramic material.

While the track link of the '025 application may disclose a track link having a guidance horn with a discrete ceramic material embedded in the light alloy thereof, the '025 does not provide wear resistance or increased toughness for a sprocket-engaging surface or a roller-engaging surface of the track link. Furthermore, the track link of the '025 application may be formed of a light alloy, which may not provide adequate bearing strength or toughness for some applications. The multi-material track pad of the present disclosure solves one or more of the problems set forth above and/or other problems in the art.

SUMMARY

In some aspects, the present disclosure is related to a track pad for a continuous track assembly, comprising a body with a ground-engaging surface, wherein the body is formed of a metal material with a first hardness; a roller-engaging surface, wherein the roller-engaging surface is formed of a ceramic material with a second hardness that is greater than the first hardness; and a sprocket-engaging surface formed of the ceramic material.

In some aspects, the present disclosure is related to a track pad for a continuous track assembly, comprising a body formed of a first material with a first hardness; a roller-engaging surface configured to engage a roller of the continuous track assembly, wherein the roller-engaging surface is formed of a second material with a second hardness that is greater than the first hardness, and wherein the second material is configured to engage the roller; and a sprocket-engaging surface formed of the second material.

In some aspects, the present disclosure is related to a track pad of a continuous track assembly, comprising a plurality of roller-engaging surfaces provided on a body of the track pad, wherein the body is formed of a metal material with a first hardness, and wherein the roller-engaging surface is formed of a ceramic material with a second hardness, wherein the second hardness is greater than the first hardness; a plurality of sprocket-engaging surfaces provided on the body and formed of the ceramic material; and a plurality of bushings provided in the body and formed of the ceramic material.

DETAILED DESCRIPTION

This disclosure relates to a track pad. The track pad has universal applicability to any machine utilizing such a track pad in a continuous track assembly. The term "machine" may refer to any machine that has a continuous track assembly, such as heavy machinery and/or the like.

Figure 1:
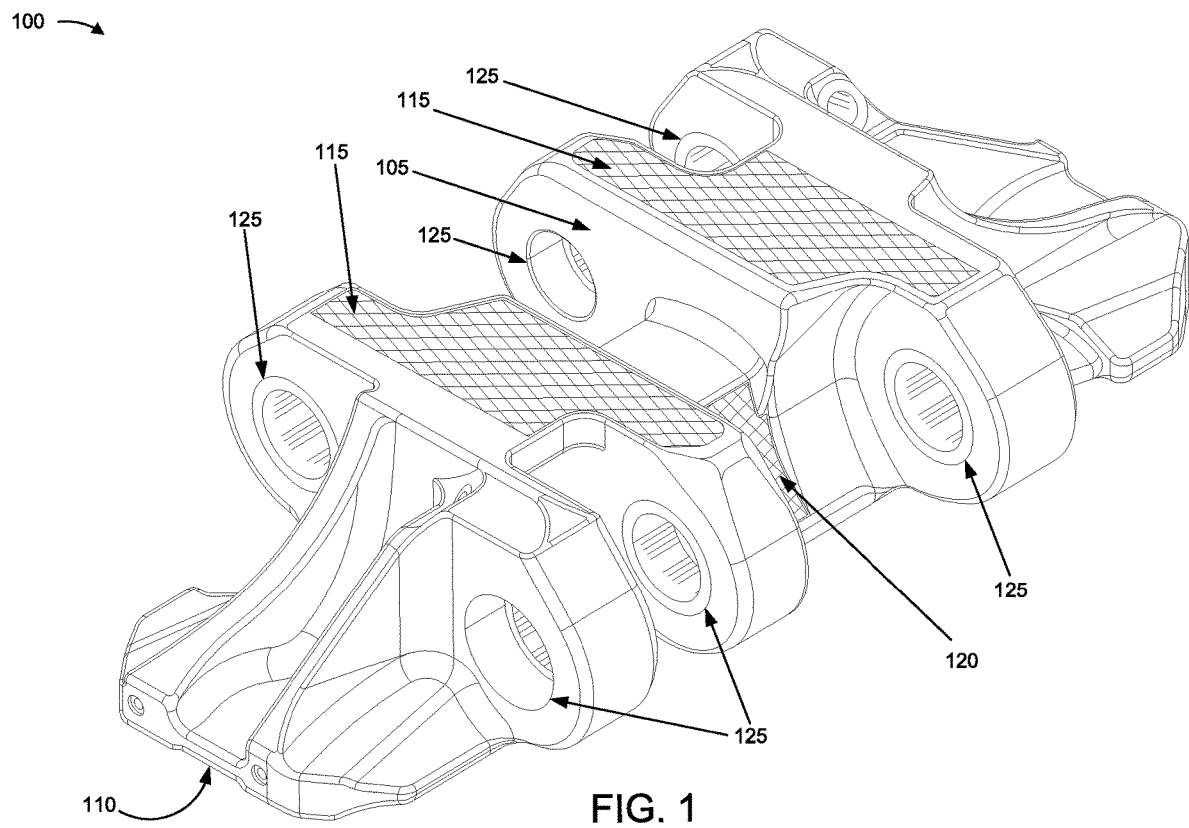
FIG. 1 is a diagram of an example track pad.

FIG. 1 is a diagram of an example track pad 100. As shown, the track pad 100 may include a body 105, a ground-engaging surface 110, one or more roller-engaging surfaces 115, one or more sprocket-engaging surfaces 120, and/or one or more bushings 125. The track pad 100 may be part of a continuous track assembly, sometimes referred to as a track chain. For example, the continuous track assembly may be composed of multiple track pads 100 linked together, as described in more detail in connection with FIG. 2, below.

In some implementations, the body 105 may be formed of steel or a similar material. For example, the body 105 may be formed using a metal casting process, such as permanent mold casting. In permanent mold casting, a casting material (e.g., steel) is poured into a mold and cooled to form the body 105. The material used to form the body 105 may be associated with a hardness that is less than a hardness of materials used for a roller-engaging surface 115, a sprocket-engaging surface 120, and/or a bushing 125. As a non-limiting example, the material used to form the body 105 may have a hardness of approximately 40 HRC. This may provide resistance to cracking or other deformation to which the body 105 may be vulnerable.

As further shown, the body 105 may be associated with a ground-engaging surface 110. In some implementations, the ground-engaging surface 110 may be a same material as the body 105. For example, the ground-engaging surface 110 may be part of the body 105. In some implementations, the ground-engaging surface 110 may be attached to the body 105. For example, the ground-engaging surface 110 may be a detachable shoe, and/or the like, that can be replaced when desired. In some implementations, the ground-engaging surface 110 may be formed of steel or a similar material. In some implementations, the ground-engaging surface 110 may be formed of a different material than the body 105.

Figure 2:
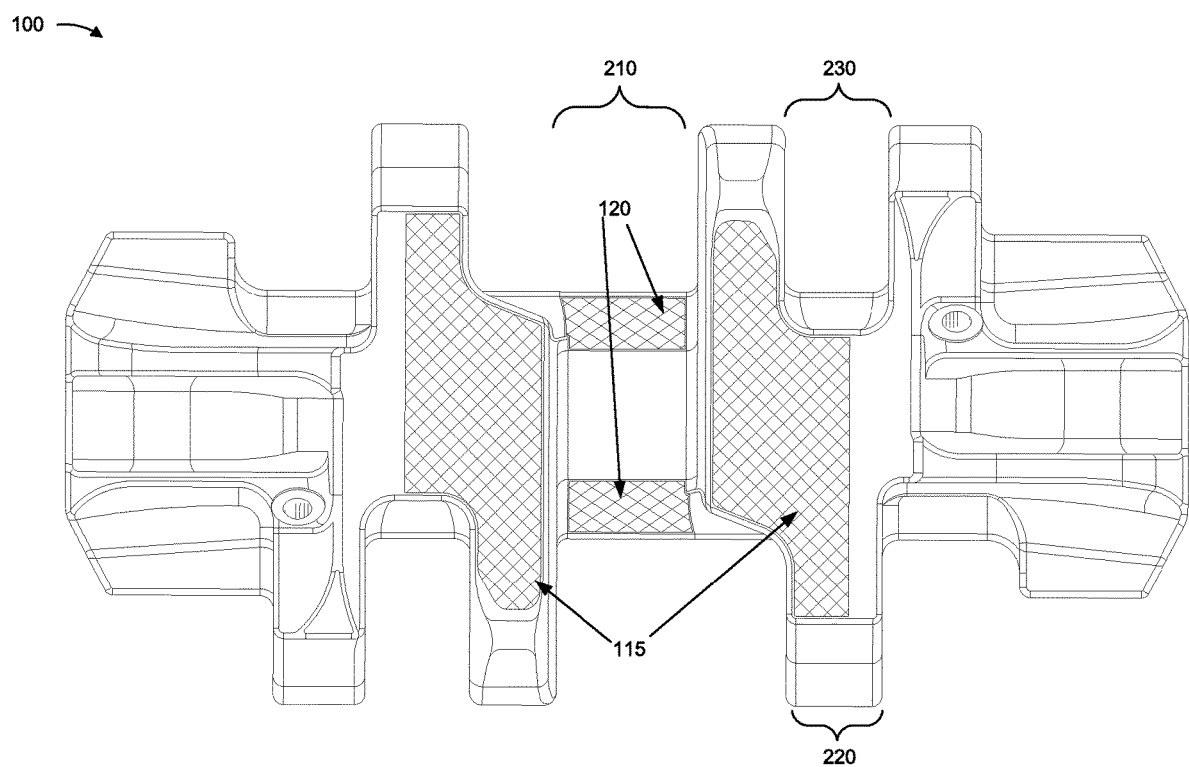
FIG. 2 is a diagram of a top view of the example track pad.
Figure 3:
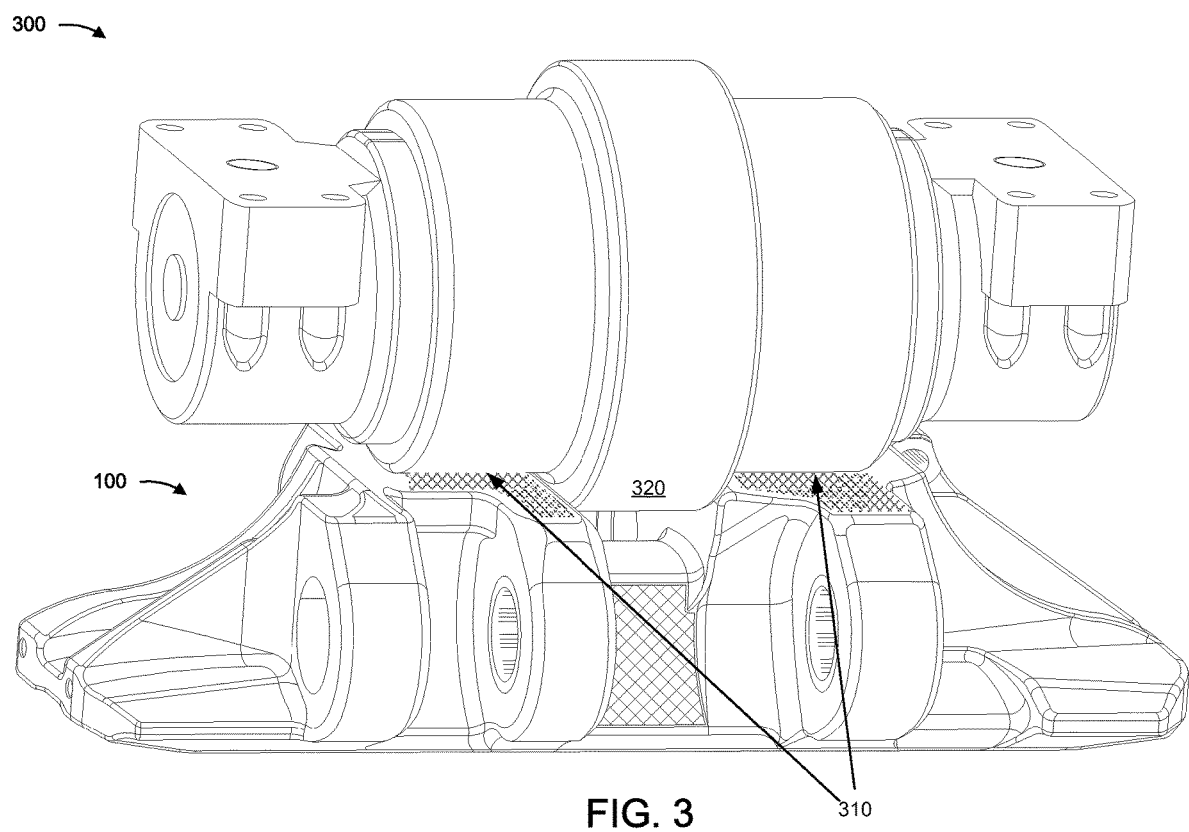
FIG. 3 is a diagram of the example track pad engaging with a roller.

The roller-engaging surfaces 115 and the sprocket-engaging surfaces 120 are shown with diamond hatching in FIGS. 1-3. The diamond hatching indicates that the roller-engaging surfaces 115 and the sprocket-engaging surfaces 120 are formed of a different material than the body 105 (e.g., and/or the ground-engaging surface 110). In some implementations, the bushings 125 may be formed of a different material than the body 105. In some implementations, the roller-engaging surfaces 115, the sprocket-engaging surfaces 120, and/or the bushings 125 may be formed of a ceramic material with a higher hardness than the body 105. In some implementations, the roller-engaging surfaces 115, the sprocket-engaging surfaces 120, and/or the bushings 125 may be formed of a non-ceramic material, such as a material with a higher hardness than the body 105 (e.g., tool-grade steel, hardened steel, carbon steel, powdered metallurgy steel, manganese steel, tungsten carbide, etc.), such as a material with a hardness of greater than approximately 45 HRC.

In some implementations, the roller-engaging surfaces 115, the sprocket-engaging surfaces 120, and/or the bushings 125 may be associated with a melting point that is higher than a melting point of the body 105. This may allow for forming of the body 105, with the roller-engaging surfaces 115, the sprocket-engaging surfaces 120, and/or the bushings 125, using metal casting techniques, as described in more detail below.

In some implementations, the track pad 100 may be formed using a metal casting technique. For example, the roller-engaging surfaces 115, the sprocket-engaging surfaces 120, and/or the bushings 125 may be suspended in a mold for the track pad 100. As another example, the roller-engaging surfaces 115, the sprocket-engaging surfaces 120, and/or the bushings 125 may be placed in the mold. For example, the roller-engaging surfaces 115 may be placed on a bottom surface of the mold and the sprocket-engaging surfaces 120 may be placed on surfaces of the mold corresponding to the sprocket-engaging surfaces 120. Molten steel may be poured into the mold to form the track pad 100. As a result of being suspended or placed in the mold, the roller-engaging surfaces, the sprocket-engaging surfaces, and/or the bushings 125 may be mated with the track pad 100.

In some implementations, a roller-engaging surface 115 or sprocket-engaging surface 120 may be at least partially embedded in the track pad 100. In some implementations, the roller-engaging surface 115 may be one of a plurality of roller-engaging surfaces 115 that are substantially parallel to each other. In some implementations, the roller-engaging surface 115 or sprocket-engaging surface 120 may be provided on a surface of the track pad 100. In some implementations, a face of the roller-engaging surface 115 or sprocket-engaging surface 120 (e.g., an inward-facing face with reference to FIG. 1) may have one or more features to cause the roller-engaging surface 115 or sprocket-engaging surface 120 to reliably mate with the track pad 100 (e.g., grooves, scores, etc.). In some implementations, the roller-engaging surfaces 115 may collectively cover substantially all of a contact area between a roller (e.g., roller 300 of FIG. 3) and the track pad 100.

In some implementations, the roller-engaging surface 115 may be substantially flat. For example, the roller-engaging surface 115 may be provided on a surface that a roller (e.g., roller 300 of FIG. 3) may engage during operation of a machine. In some implementations, the sprocket-engaging surface 120 may be a curved surface. In some implementations, the sprocket-engaging surface 120 may be substantially flat. In some implementations, the sprocket-engaging surface 120 may include a groove, a cup, and/or the like, configured to engage a sprocket (not shown). In some implementations, the sprocket-engaging surface 120 may be configured to engage a sprocket (not shown).

In some implementations, a bushing 125 may have an annular base (e.g., of a cylindrical shell of the bushing 125) that is exposed, as shown in FIG. 1. For example, the annular base may be flush with a surface of the track pad 100, or may be offset from the surface of the track pad 100. In some implementations, the annular base of the bushing 125 may be covered by the track pad 100. For example, a steel surface may wrap around the side of the bushing 125 to cover the annular base.

As indicated above, FIG. 1 is provided as an example. Other examples are possible and may differ from what was described in connection with FIG. 1.

FIG. 2 is a diagram of a top view of the example track pad 100. As shown, in some implementations, the track pad 100 may include two roller-engaging surfaces 115 and two sprocket-engaging surfaces 120. For example, a first sprocket-engaging surface 120 may engage the sprocket (not shown) when the sprocket operates in a first (e.g., forward) direction, and a second sprocket-engaging surface 120 may engage the sprocket when the sprocket operates in a second (e.g., reverse) direction. Bushings 125 are not shown in FIG. 2 for simplicity. Implementations described herein may or may not include bushings 125.

A roller (e.g., roller 300, shown in FIG. 3) may engage the roller-engaging surfaces 115. In some implementations, the roller may include a guide element to guide the track pad 100 in motion. For example, the guide element (shown in FIG. 3) may be provided in the slot 210 (which is also shown in FIG. 1).

Multiple track pads 100 may be connected to each other to form a track chain or continuous track. For example, the protrusion 220 may fit into the slot 230. The bushings 125 may be provided in respective protrusions 220. A pin or similar element may be inserted through the bushings 125 (not shown in FIG. 2) to link adjacent track pads 100.

As indicated above, FIG. 2 is provided as an example. Other examples are possible and may differ from what was described in connection with FIG. 2.

FIG. 3 is a diagram of the track pad 100 engaging with a roller 300. As shown by reference number 310, the roller 300 may engage the roller-engaging surfaces (e.g., roller-engaging surfaces 115 of FIGS. 1 and 2). As further shown, a guide element 320 may extend into a slot (e.g., slot 210 of FIG. 2), and may be configured to guide the track pad 100 during operation of a machine. For example, the slot may be configured to receive the guide element 320 when the roller 300 engages the roller-engaging surfaces. As shown, the guide element 320 may not engage a top surface of the track pad 100.

As indicated above, FIG. 3 is provided as an example. Other examples are possible and may differ from what was described in connection with FIG. 3.

INDUSTRIAL APPLICABILITY

The track pad 100 described herein may improve expected service life of track pads of continuous track assemblies. By way of example only, an expected service life of a track pad may be extended two-fold (or more) in comparison to some techniques for hardening surfaces, such as induction-based hardening. For example, the increased hardness of the roller-engaging surfaces 115, sprocket-engaging surfaces 120, and/or bushings 125 may provide improved bearing strength and resistance to friction-based wear in comparison to induction-based hardening, thus improving service life.

The technique of suspending or placing the bushings 125 in the casting mold may increase an upper limit of hardness for the bushings 125. For example, one technique for placing bushings in a track pad is the interference fitting technique, wherein a bushing is compressed to fill the opening and secure the bushing. However, the interference fitting technique may limit the hardness of materials that can be used for the bushings, since interference fitting may cause cracking of sufficiently hard materials. By suspending or placing the bushings 125 in the casting mold for casting of the track pad 100, a harder material may be used for the bushings 125, thereby improving service life and wear resistance of the bushings 125.

In some implementations, the roller-engaging surfaces 115 and/or the sprocket-engaging surfaces 120 may be embedded in the track pad 100. This may prevent contaminants from entering between the surfaces and the track pad 100. In some implementations, an annular base of the bushing 125 may be enclosed by the body 105. This may also prevent contaminants from entering between the bushing 125 and the body 105, thereby increasing the expected service life of the bushing 125.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A track pad for a continuous track assembly, comprising:
   a body with a ground-engaging surface,
      wherein the body is formed of a metal material with a first hardness;
   a roller-engaging surface,
      wherein the roller-engaging surface is formed of a ceramic material with a second hardness that is greater than the first hardness;
   a first sprocket-engaging surface formed of the ceramic material;
   a second sprocket-engaging surface formed of the ceramic material,
      wherein the first sprocket-engaging surface is separate from the second sprocket-engaging surface in a longitudinal direction; and
   one or more bushings configured to link the track pad to another track pad,
      wherein the one or more bushings are in the body and formed of the ceramic material, and
      wherein the one or more bushings are suspended or placed in a same casting mold used for casting of the track pad.

2. The track pad of claim 1, wherein the roller-engaging surface is embedded in the body.

3. The track pad of claim 1, wherein the roller-engaging surface is provided on a surface of the body.

4. The track pad of claim 1, wherein the roller-engaging surface is substantially flat.

5. The track pad of claim 1, wherein the roller-engaging surface is one of a plurality of roller-engaging surfaces that are substantially parallel to each other.

6. The track pad of claim 1, wherein the sprocket-engaging surface is curved.

7. The track pad of claim 1,
   wherein the first sprocket-engaging surface is configured to engage a sprocket when the sprocket operates in in a first direction, and
   wherein the second sprocket-engaging surface is configured to engage the sprocket when the sprocket operates in a second direction.

8. A track pad for a continuous track assembly, comprising:
   a body formed of a first material with a first hardness;
   a roller-engaging surface configured to engage a roller of the continuous track assembly,
      wherein the roller-engaging surface is formed of a second material with a second hardness that is greater than the first hardness,
      wherein the second material is configured to engage the roller; and
   a plurality of bushings configured to link the track pad to another track pad,
      wherein the plurality of bushings are in the body and formed of the second material, and
      wherein the plurality of bushings are cast in a same casting mold as the track pad.

9. The track pad of claim 8, wherein the plurality of bushings are provided in protrusions of the body.

10. The track pad of claim 8, wherein the first material is a steel; and
    wherein the second material includes at least one of:
       a tool-grade steel,
       a hardened steel,
       a carbon steel,
       a manganese steel,
       a powdered metallurgy steel, or
       a tungsten carbide.

11. The track pad of claim 8, further comprising:
    a slot configured to receive a guide element of the roller.

12. The track pad of claim 11, wherein the roller-engaging surface is a first roller-engaging surface and wherein the slot is between the first roller-engaging surface and a second roller-engaging surface.

13. The track pad of claim 8, wherein the roller-engaging surface is provided on a surface that the roller engages with during an operation of a machine.

14. The track pad of claim 8, wherein the roller-engaging surface is associated with a melting point that is higher than a melting point of the body.

15. A track pad of a continuous track assembly, comprising:
    a plurality of sprocket-engaging surfaces provided on a body of the track pad,
       wherein the body is formed of a metal material with a first hardness,
       wherein the plurality of sprocket-engaging surfaces are formed of a ceramic material with a second hardness,
       wherein the second hardness is greater than the first hardness,
       wherein a first sprocket-engaging surface, of the plurality of sprocket-engaging surfaces, is separate from a second sprocket-engaging surface, of the plurality of sprocket-engaging surfaces, in a longitudinal direction; and a plurality of bushings provided in the body and formed of the ceramic material,
   wherein the plurality of bushings are suspended or placed in a same casting mold as the track pad.

16. The track pad of claim 15, wherein annular bases of the plurality of bushings are at least partially enclosed by the body.

17. The track pad of claim 15, further comprising:
a plurality of roller-engaging surfaces provided on the body and formed of the ceramic material,
   wherein the plurality of roller-engaging surfaces collectively cover substantially all of a contact area between a roller and the track pad.

18. The track pad of claim 15, further comprising:
a plurality of roller-engaging surfaces provided on the body and formed of the ceramic material,
   wherein a slot is provided between two roller-engaging surfaces of the plurality of roller-engaging surfaces, and
   wherein the slot is configured to receive a guide element of a roller when the roller engages the plurality of roller-engaging surfaces.

19. The track pad of claim 15,
wherein the first sprocket-engaging surface is configured to engage when a sprocket operates in a first direction, and
wherein the second sprocket-engaging surface is configured to engage when the sprocket operates in a second direction.

20. The track pad of claim 15, further comprising:
a plurality of roller-engaging surfaces provided on the body,
   wherein the plurality of roller-engaging surfaces are at least partially embedded in the body.

* * * * *